US012783159B2

(12) United States Patent
Lee

(10) Patent No.: US 12,783,159 B2
(45) Date of Patent: Nov. 3, 2026

(54) STORAGE DEVICE FOR PERFORMING READ RECLAIM OPERATION

(71) Applicant: Samsung Electronics Co., Ltd., Suwon-si (KR)

(72) Inventor: Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/826,911

(22) Filed: Sep. 6, 2024

(65) Prior Publication Data

US 2025/0291509 A1 Sep. 18, 2025

(30) Foreign Application Priority Data

Mar. 15, 2024 (KR) ........................ 10-2024-0036280

(51) Int. Cl.
*G06F 3/06* (2006.01)

(52) U.S. Cl.
CPC .......... *G06F 3/0655* (2013.01); *G06F 3/0619* (2013.01); *G06F 3/0679* (2013.01)

(58) Field of Classification Search
CPC ..... G06F 3/0655; G06F 3/0619; G06F 3/0679
See application file for complete search history.

(56) References Cited

U.S. PATENT DOCUMENTS 11,733,883 B2 * 8/2023 Kwak ................. G06F 11/3065 713/320
2016/0217032 A1 7/2016 Yum et al.
2017/0010838 A1 1/2017 Hong et al.
2017/0168891 A1 * 6/2017 Park ..................... G11C 16/349
2017/0177425 A1 6/2017 Jei et al.
2019/0196958 A1 * 6/2019 Lee ........................ G11C 16/26
2019/0227738 A1 7/2019 Youn et al.
2021/0043261 A1 2/2021 Yu et al.
2022/0308782 A1 * 9/2022 Song ..................... G06F 3/0635
2023/0103694 A1 4/2023 Kang et al.
2024/0176700 A1 * 5/2024 Seo ..................... G06F 11/1068

* cited by examiner

*Primary Examiner* — Bryce P Bonzo
*Assistant Examiner* — Audrey Emma Whitesell
(74) *Attorney, Agent, or Firm* — Muir Patent Law, PLLC

(57) ABSTRACT

A storage device according to the present disclosure includes a non-volatile memory device including a plurality of memory blocks, and a storage controller configured to determine a plurality of error bit counts, each of the plurality of error bit counts indicating a number of error bits of a respective one of the plurality of memory blocks, generate, based on the plurality of error bit counts, reclaim group information indicating respective assigned reclaim groups for each of the plurality of memory blocks, and control the non-volatile memory device to perform a respective read reclaim operation for each of the plurality of reclaim groups based on the reclaim group information, wherein for each of the plurality of reclaim groups, the respective read reclaim operation is performed according to a different reclaim period.

19 Claims, 11 Drawing Sheets

FIG. 7

1220

RECLAIM GROUP INFORMATION

1221

| | BLK ID | REFERENCE ERROR BIT RANGE | RC PERIOD |
|---|---|---|---|
| RC GROUP 1 | BLK1, BLK5, BLK9 | FIRST REFERENCE ERROR BIT RANGE | PERIOD 1 |
| RC GROUP 2 | BLK2, BLK7, BLK8 | SECOND REFERENCE ERROR BIT RANGE | PERIOD 2 |
| ⋮ | ⋮ | ⋮ | ⋮ |
| RC GROUP 5 | BLK3, BLK4, BLK6 | FIFTH REFERENCE ERROR BIT RANGE | PERIOD 5 |

STORAGE DEVICE FOR PERFORMING READ RECLAIM OPERATION

CROSS-REFERENCE TO RELATED APPLICATION

This application claims priority to and the benefit of Korean Patent Application No. 10-2024-0036280 filed in the Korean Intellectual Property Office on Mar. 15, 2024, the entire contents of which are incorporated herein by reference.

BACKGROUND OF THE INVENTION

(a) Field of the Invention

The present disclosure relates to a storage device for performing a read reclaim operation.

(b) Description of the Related Art

A storage device may include a non-volatile memory device for storing data and a storage controller for controlling the non-volatile memory device. Error bits may occur in data stored in the non-volatile memory device as time elapses. Before the number of error bits included in the data become greater than the number of uncorrectable error bits, the storage device may perform a read reclaim operation to ensure the reliability of the data stored in the non-volatile memory device.

SUMMARY OF THE INVENTION

The present disclosure attempts to provide a storage device capable of performing a read reclaim operation in consideration of characteristics of each of a plurality of memory blocks.

A storage device according to an exemplary embodiment includes a non-volatile memory device including a plurality of memory blocks, and a storage controller configured to determine a plurality of error bit counts, each of the plurality of error bit counts indicating a number of error bits of a respective one of the plurality of memory blocks, generate, based on the plurality of error bit counts, reclaim group information associated with a plurality of reclaim groups, the reclaim group information indicating, for each of the plurality of memory blocks, a respective assigned reclaim group among the plurality of reclaim groups, wherein each of the plurality of reclaim groups is associated with a respective error bit count range, and control the non-volatile memory device to perform a respective read reclaim operation for each of the plurality of reclaim groups based on the reclaim group information, wherein for each of the plurality of reclaim groups, the respective read reclaim operation is performed according to a different reclaim period.

A storage device according to an exemplary embodiment includes a non-volatile memory device including a plurality of memory blocks, and a storage controller configured to assign, to a first reclaim group, a first set of memory blocks among the plurality of memory blocks, the first set of memory blocks having respective error bit counts falling within a first reference error bit count range, assign, to a second reclaim group, a second set of memory blocks among the plurality of memory blocks, the second set of memory blocks having respective error bit counts falling within a second reference error bit count range, and control the non-volatile memory device to perform a read reclaim operation for the first reclaim group according to a first reclaim period and perform a read reclaim operation for the second reclaim group according to a second reclaim period different from the first reclaim period.

A storage controller according to an exemplary embodiment includes a memory interface configured to communicate with a non-volatile memory device including a plurality of memory blocks, and a read reclaim controller configured to control the non-volatile memory device to perform a read reclaim operation on the plurality of memory blocks, determine, based on the read reclaim operation performed on the plurality of memory blocks, a plurality of error bit counts including a respective error bit count for each of the plurality of memory blocks, and based on the plurality of error bit counts, identify, from among the plurality of memory blocks, a first set of memory blocks on which to perform a read reclaim operation according to a first reclaim period and a second set of memory blocks on which to perform a read reclaim operation according to a second reclaim period longer than the first reclaim period.

BRIEF DESCRIPTION OF THE DRAWINGS

FIG. 7 is a drawing for explaining the storage device according to the exemplary embodiment which generates reclaim group information based on error bit counts of memory blocks.

DETAILED DESCRIPTION OF THE EMBODIMENTS

Figure 1:
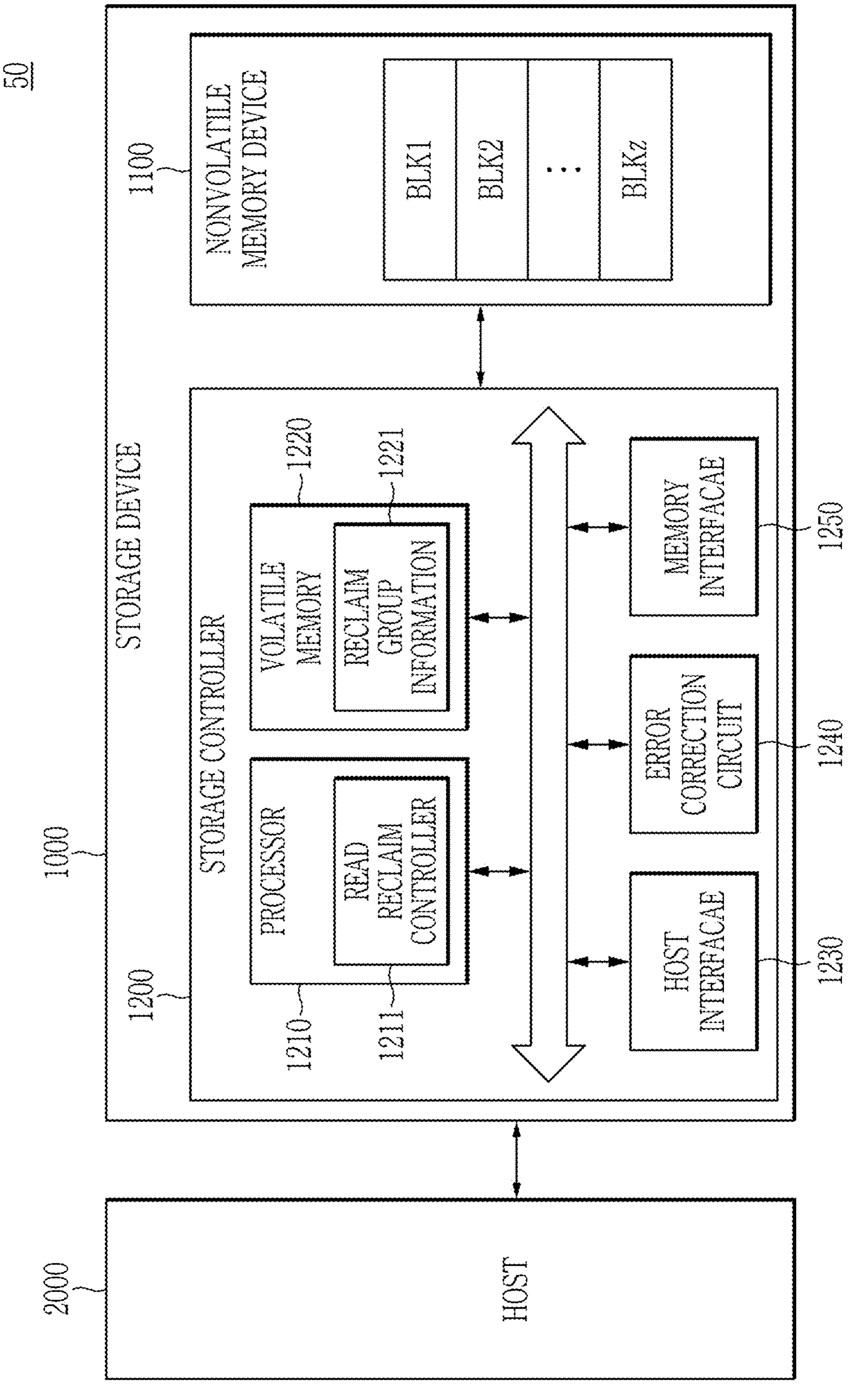
FIG. 1 is a drawing for explaining an electronic system including a storage device according to an exemplary embodiment.

Throughout the specification, when a component is described as "including" a particular element or group of elements, it is to be understood that either the component is formed of only the element or the group of elements, or the element or group of elements may be combined with additional elements to form the component, unless the context indicates otherwise. The term “consisting of,” on the other hand, indicates that a component is formed only of the element(s) listed.

Ordinal numbers such as “first,” “second,” “third,” etc. may be used simply as labels of certain elements, steps, etc., to distinguish such elements, steps, etc. from one another. Terms that are not described using “first,” “second,” etc., in the specification, may still be referred to as “first” or “second” in a claim. In addition, a term that is referenced with a particular ordinal number (e.g., “first” in a particular claim) may be described elsewhere with a different ordinal number (e.g., “second” in the specification or another claim).

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The drawings and description are to be regarded as illustrative in nature and not restrictive. Like reference numerals designate like elements throughout the specification.

In addition, unless explicitly described to the contrary, the word “comprise”, and variations such as “comprises” or “comprising”, will be understood to imply the inclusion of stated elements but not the exclusion of any other elements.

FIG. 1 is a drawing for explaining an electronic system including a storage device according to an exemplary embodiment.

Referring to FIG. 1, an electronic system 50 may include a storage device 1000 and a host 2000.

The storage device 1000 may be a device for storing data under the control of the host 2000. In the exemplary embodiment, the storage device 1000 may be manufactured in the form of a solid state drive (SSD), a universal flash storage (UFS), etc.

The storage device 1000 may include a non-volatile memory device 1100 and a storage controller 1200.

The non-volatile memory device 1100 may store data. The non-volatile memory device 1100 may operate in response to the control of the storage controller 1200. In the exemplary embodiment, the non-volatile memory device 1100 may be a NAND flash memory. The non-volatile memory device 1100 may include a plurality of memory blocks BLK1 to BLKz for storing data. Each of the plurality of memory blocks BLK1 to BLKz may include a plurality of memory cells.

The non-volatile memory device 1100 may receive commands and addresses from the storage controller 1200, and perform operations indicated by the commands on areas indicated by the addresses. The non-volatile memory device 1100 may perform programming operations (write operations) for storing data, read operations for reading data, and erase operations for erasing data, on the areas indicated by the addresses.

The storage controller 1200 may control the overall operation of the storage device 1000.

In the exemplary embodiment, the storage controller 1200 may execute instructions or code comprised in firmware when power is applied to the storage device 1000. The firmware may include a host interface layer for controlling communication with the host 2000, a flash conversion layer for controlling communication between the host 2000 and the non-volatile memory device 1100, and a memory interface layer for controlling communication with the non-volatile memory device 1100. In the exemplary embodiment, the flash conversion layer may convert logical addresses of the host 2000 into physical addresses of the non-volatile memory device 1100.

In the exemplary embodiment, the storage controller 1200 may control the non-volatile memory device 1100 such that the non-volatile memory device 1100 performs write operations, read operations, erase operations, or the like according to a request of the host 2000. For write operations, the storage controller 1200 may provide write commands, addresses, and data to the non-volatile memory device 1100. For read operations, the storage controller 1200 may provide read commands and addresses to the non-volatile memory device 1100. For erase operations, the storage controller 1200 may provide erase commands and addresses to the non-volatile memory device 1100.

In an exemplary embodiment, the storage controller 1200 may include a processor 1210, a volatile memory 1220, a host interface 1230, an error correction circuit 1240, and a memory interface 1250.

The processor 1210 may control the overall operation of the storage controller 1200. The processor 1210 may control the operation of the storage controller 1200 such that the storage controller stores data provided by the host 2000 in the non-volatile memory device 1100.

The volatile memory 1220 may be used as a buffer memory, a cache memory, an operation memory, and the like for the storage controller 1200.

The volatile memory 1220 may temporarily store data provided from the host 2000 and/or data read from the non-volatile memory device 1100. In the exemplary embodiment, the volatile memory 1220 may be a dynamic random access memory (DRAM) or a static random access memory (SRAM). In the exemplary embodiment, the volatile memory 1220 may be positioned inside the storage controller 1200, or may be positioned outside the storage controller 1200.

The host interface 1230 may perform communication with the host 2000. The host interface 1230 may receive data from the host 2000 and provide data to the host 2000.

The error correction circuit 1240 may perform error correction operations. In the exemplary embodiment, the error correction circuit 1240 may perform error correction encoding (ECC encoding) on data to be stored in the non-volatile memory device 1100 through the memory interface 1250. The data subjected to the error correction encoding may be transferred to the non-volatile memory device 1100 through the memory interface 1250. In the exemplary embodiment, the error correction circuit 1240 may perform error correction decoding (ECC decoding) on data received from the non-volatile memory device 1100.

The memory interface 1250 may perform communication with the non-volatile memory device 1100. The memory interface 1250 may provide commands, addresses, data, and the like to the non-volatile memory device 1100. The memory interface 1250 may receive data stored in the non-volatile memory device 1100.

In the exemplary embodiment, the processor 1210 may include a read reclaim controller 1211. The read reclaim controller 1211 may control the non-volatile memory device 1100 to perform read reclaim operations on the plurality of memory blocks BLK1 to BLKz of the non-volatile memory device 1100. Any such read reclaim operation may involve migrating data stored in one or more memory blocks to one or more other memory blocks. In the exemplary embodiment, the one or more other memory blocks may be free blocks. The free blocks may be memory blocks with no data stored in them.

In the exemplary embodiment, the read reclaim operations may be performed in order to prevent the numbers of error bits included in data stored in memory blocks of the non-volatile memory device from becoming greater than a number of uncorrectable error bits. In the exemplary embodiment, following storing of data in any given memory block, the number of error bits in the data stored in that memory block may tend to increase as read operations are recurringly performed on that memory block. In the exemplary embodiment, the number of error bits in the data stored in any given memory block may tend to increase as the amount of time elapsed since storing of the data in that memory block increases.

In the exemplary embodiment, the read reclaim controller 1211 may control the non-volatile memory device 1100 to perform read reclaim operations based on read counts of the plurality of memory blocks BLK1 to BLKz. In the exemplary embodiment, the read counts may be the numbers of times read operations have been performed on the plurality of memory blocks BLK1 to BLKz since the storing of the data stored in those memory blocks. In the exemplary embodiment, the read reclaim controller 1211 may control the non-volatile memory device 1100 to perform read reclaim operations on memory blocks having associated read counts greater than a reference read count.

In the exemplary embodiment, the read reclaim operations may include reading data from one or more of memory blocks BLK1 to BLKz, storing the data in other memory block(s), and designating the one or memory blocks as free blocks.

In the exemplary embodiment, the read reclaim controller 1211 may determine a plurality of error bit counts including a respective error bit count for each of the plurality of memory blocks BLK1 to BLKz. In the exemplary embodiment, each of the plurality of error bit counts may indicate a number of error bits included in the data stored in a respective one of the plurality of memory blocks BLK1 to BLKz. In the exemplary embodiment, the read reclaim controller 1211 may control the non-volatile memory device 1100 to perform read reclaim operations based on the plurality of error bit counts. In the exemplary embodiment, the read reclaim controller 1211 may control the non-volatile memory device 1100 to perform read reclaim operations on memory blocks having associated error bit counts greater than a reference error bit count.

In the exemplary embodiment, the read reclaim controller 1211 may assign the plurality of memory blocks BLK1 to BLKz to reclaim groups based on the plurality of error bit counts.

In the exemplary embodiment, the read reclaim controller 1211 may assign memory blocks having error bit counts that fall within the same reference error bit count to the same reclaim group associated with that reference error bit count range. In the exemplary embodiment, the read reclaim controller may assign each memory block to one of a plurality of reclaim groups based on the error bit count for that memory block. In the exemplary embodiment, the read reclaim controller 1211 may control the non-volatile memory device 1100 to perform read reclaim operations on a per-reclaim group basis.

In the exemplary embodiment, the read reclaim controller 1211 may assign, to a first reclaim group, a first set of memory blocks among the plurality of memory blocks BLK1 to BLKz, the first set of memory blocks having respective error bit counts falling within a first reference error bit count range. In the exemplary embodiment, the read reclaim controller 1211 may assign, to a second reclaim group, a second set of memory blocks among the plurality of memory blocks BLK1 to BLKz, the second set of memory blocks having respective error bit counts falling within a second reference error bit count range. In the exemplary embodiment, a smallest error bit count included in the first reference error bit count range may exceed a largest error bit count included in the second reference error bit count range.

In the exemplary embodiment, the read reclaim controller 1211 may determine respective reclaim periods according to which to perform read reclaim operations for each of the plurality of reclaim groups. In the exemplary embodiment, the read reclaim controller 1211 may apply different respective reclaim periods to read reclaim operations for each of the plurality of reclaim groups.

In the exemplary embodiment, the read reclaim controller 1211 may assign the plurality of memory blocks BLK1 to BLKz to reclaim groups and generate reclaim group information 1221 which includes ID information associated with respective memory blocks assigned to each of the plurality of reclaim groups and reclaim period information indicating the respective reclaim periods applicable to each of the plurality of reclaim groups. In the exemplary embodiment, the read reclaim controller 1211 may store the reclaim group information 1221 in the volatile memory 1220.

In the exemplary embodiment, the read reclaim controller 1211 may control the non-volatile memory device 1100 to perform read reclaim operations for each of the plurality of reclaim groups based on the reclaim group information 1221. In the exemplary embodiment, the read reclaim controller 1211 may control the non-volatile memory device 1100 to perform respective read reclaim operations for each of the plurality of reclaim groups according to different reclaim periods indicated by the reclaim period information included in the reclaim group information 1221. In the exemplary embodiment, the read reclaim controller 1211 may control the non-volatile memory device 1100 to perform a read reclaim operation for the first reclaim group according to a first reclaim period and perform a read reclaim operation for the second reclaim group according to a second reclaim period, and the second reclaim period may be shorter than the first reclaim period.

In the exemplary embodiment, the volatile memory 1220 may store information indicating the respective read counts of each of the plurality of memory blocks BLK1 to BLKz. In the exemplary embodiment, the volatile memory 1220 may store information indicating the respective error bit counts of each of the plurality of memory blocks BLK1 to BLKz.

In the exemplary embodiment, the volatile memory 1220 may store the reclaim group information 1221. The reclaim group information 1221 may be information identifying respective sets of memory blocks assigned to each of the plurality of reclaim groups, respective applicable reclaim periods for each of the plurality of reclaim groups, and respective reference error bit count ranges associated with each of the plurality of reclaim groups.

Figure 2:
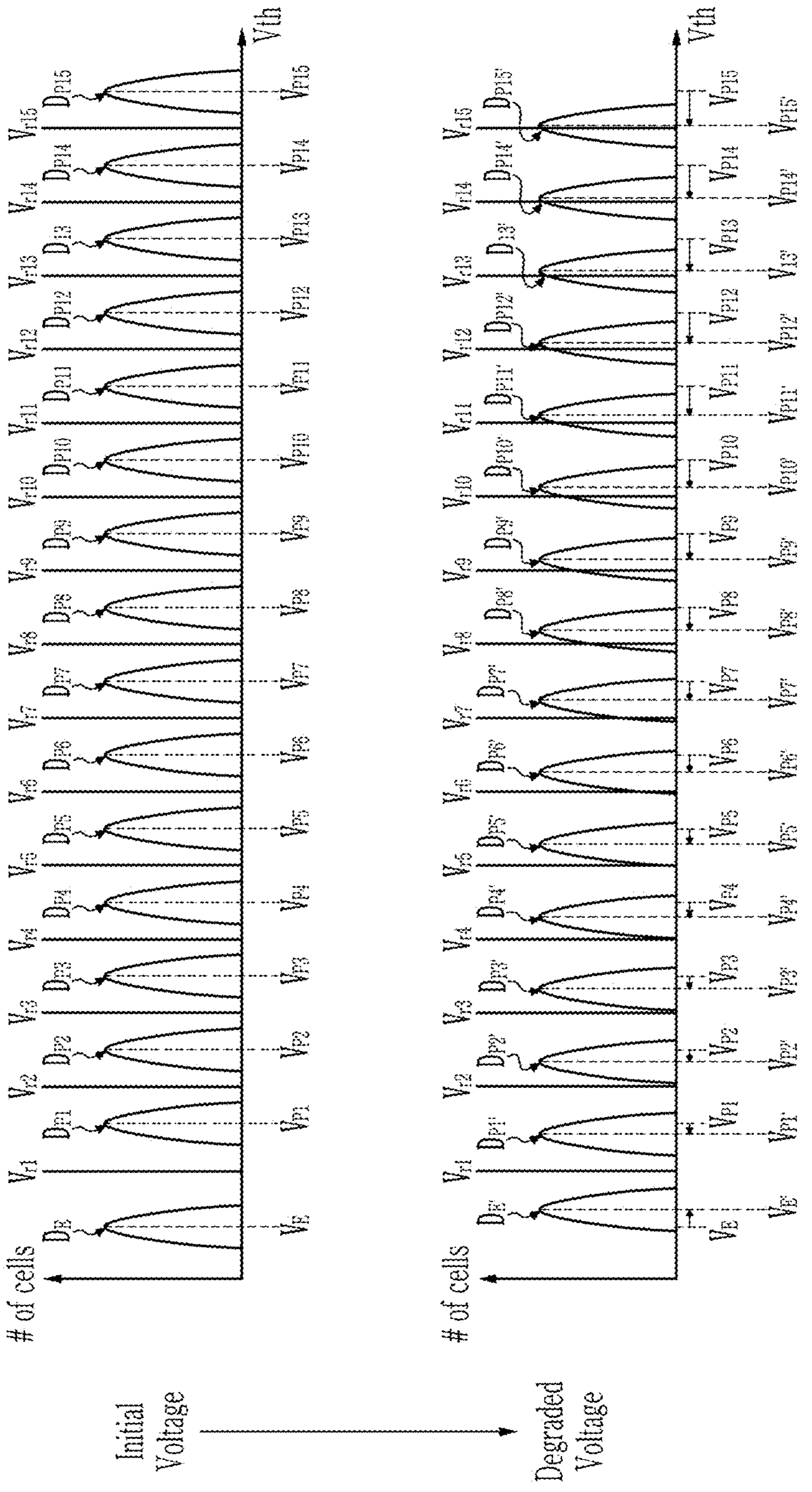
FIG. 2 is a drawing for explaining variation in the threshold voltage distribution of memory cells according to an exemplary embodiment.

FIG. 2 is a drawing for explaining variation in the threshold voltage distribution of memory cells according to an exemplary embodiment.

In FIG. 2, the horizontal axis of the graph represents the threshold voltage Vth of the memory cells and the vertical axis of the graph represents the number of memory cells (# of cells).

With reference to FIG. 2, a case where the memory cells are programmed as quad level cells (QLCs) for storing four bits of data will be described as an example. Referring to FIG. 2, the non-volatile memory device 1100 may perform a programming operation to store data in a plurality of memory cells included in the plurality of memory blocks BLK1 to BLKz in response to a programming command of the storage controller 1200.

The programming operation may involve programming each of the plurality of memory cells into one of a plurality of logical states. The plurality of logical states may include an erase state E and first to fifteenth program states P1 to P15. Associated with each logical state may be a different respective program voltage that represents a voltage to which the threshold voltage $V_{th}$ of a memory cell can be set in order to program that memory cell into that logical state. The erase state E may have an associated program voltage $V_E$, and the first to fifteenth program states P1 to P15 may have respective associated program voltages $V_{P1}$ to $V_{P15}$. Thus, for instance, a memory cell may be programmed into the first program state P1 by setting its threshold voltage to $V_{P1}$.

When the non-volatile memory device 1100 programs memory cells, the actual threshold voltages $V_{th}$ that are realized in the memory cells may vary slightly from the "target" program voltages associated with their logical states. For any given logical state, the realized threshold voltages $V_{th}$ for memory cells programmed into that state may assume a distribution about the associated program voltage, such that some fall below the program voltage and others exceed the program voltage.

FIG. 2 depicts voltage distributions $D_E$ and $D_{P1}$ to $D_{P15}$ that illustrate an example of the threshold voltages $V_{th}$ that may be realized when memory cells are programmed into erase state E and first to fifteenth program states P1 to P15, respectively. Each of voltage distributions $D_E$ and $D_{P1}$ to $D_{P15}$ is approximately centered on the program voltage associated with its corresponding logical state. For instance, voltage distribution $D_E$ is approximately centered on the program voltage $V_E$ associated with the erase state E, voltage distribution $D_{P1}$ is approximately centered on the program voltage $V_{P1}$ associated with the first program state P1, and so forth.

In the exemplary embodiment, the non-volatile memory device 1100 may read data stored in its memory cells according to a plurality of read voltages. The plurality of read voltages may include first to fifteenth read voltages Vr1 to Vr15, each of which may correspond to a respective one of the first to fifteenth program states P1 to P15. To read data from a memory cell, the non-volatile memory device 1100 may detect a logical state of the memory cell based on a largest read voltage that is less than the threshold voltage of the memory cell. For example, the non-volatile memory device 1100 may detect the fifteenth program state P15 with respect to cells having threshold voltages exceeding $V_{P15}$, may detect the fourteenth program state P14 with respect to cells having threshold voltages exceeding $V_{P14}$ but not exceeding $V_{P15}$, and so forth. In the depicted example involving QLC memory cells, each possible logical state may have a predefined association with a respective four-bit value, and thus by detecting the logical state of a memory cell, the non-volatile memory device 1100 may read four bits of data from that memory cell.

In the exemplary embodiment, the threshold voltages of the plurality of memory cells may tend to degrade over time. With respect to cells programmed into any of the first to fifteenth program states P1 to P15, the threshold voltages may tend to decrease over time, such that they assume degraded threshold voltage distributions $D_{P1}'$ to $D_{P15}'$, respectively, that are shifted to the left relative to voltage distributions $D_{P1}$ to $D_{P15}$. With respect to cells programmed into the erase state E, the threshold voltages may tend to increase (shift right) over time, such that the assume a degraded threshold voltage distribution $D_E'$ that is shifted to the right relative to voltage distribution $D_E$.

In the exemplary embodiment, as illustrated in FIG. 2, the voltage distribution shifts associated with the degradation of cell threshold voltages can result in the threshold voltages of some memory cells becoming lower than the read voltages associated with their programmed logical states. As a result, their logical states—and thus, the bits that they contain—may be misidentified For instance, with respect to memory cells initially programmed into the fifteenth program state P15 in the example shown in FIG. 2, voltage degradation results in the threshold voltages of nearly half of those cells dropping below the read voltage Vr15 associated with the fifteenth program state P15. As a result, nearly half of the cells intended to be in the fifteenth program state P15 may be erroneously determined to be in the fourteenth program state P14, and thus to contain the four-bit value associated with the fourteenth program state P14 rather than that associated with the fifteenth program state P15. Those memory cells may therefore include error bits.

In the exemplary embodiment, the degrees of changes in the threshold voltages of the plurality of memory cells over time may be greater for program states having higher associated program voltages.

In the exemplary embodiment, the rate of threshold voltage degradation may be greater with respect to memory cells storing greater numbers of bits than the rate of threshold voltage degradation with respect to memory cells storing lesser numbers of bits. Thus, for instance, the rate of threshold voltage degradation with respect to quad level cells (QLCs), which can store up to 4 bits of data per memory cell, may be greater than the rate of threshold voltage degradation with respect to triple level cells (TLCs) which can store up to 3 bits of data per memory cell. In the exemplary embodiment, since the rate of threshold voltage degradation of QLCs is greater than that of TLCs, error bits may accumulate more quickly in QLCs than they do in TLCs. In the exemplary embodiment, since error bits may accumulate more quickly in QLCs, QLCs may benefit from operations for correcting error bits or operations for reading data including fewer error bits than the number of uncorrectable error bits.

In the exemplary embodiment, since error bits are caused by the degradation of threshold voltages of some memory cells to voltages lower than their associated program voltages, the storage device 1000 may perform read reclaim operations on memory blocks including those memory cells before the numbers of error bits in those memory cells become greater than the number of uncorrectable error bits.

In the exemplary embodiment, since when the four or more bits of data are stored in each of a plurality of memory cells, the degrees of changes in the threshold voltages of the plurality of memory cells over time are greater, the storage device 1000 may additionally perform operations for correcting error bits or operations for reading data including fewer error bits than the number of uncorrectable error bits, whereby the performance of the storage device 1000 may be degraded. Therefore, the storage device 1000 may periodically perform read reclaim operations on the plurality of memory blocks BLK1 to BLKz with a fixed period before the numbers of error bits of the plurality of memory blocks BLK1 to BLKz become greater than the number of uncorrectable error bits. In the exemplary embodiment, before the numbers of error bits of the plurality of memory blocks BLK1 to BLKz become greater than the number of uncorrectable error bits, the storage device 1000 may perform read reclaim operations on the plurality of memory blocks BLK1 to BLKz when a predetermined time elapses from the times when read operations have last been performed on each of the plurality of memory blocks BLK1 to BLKz.

Figure 3:
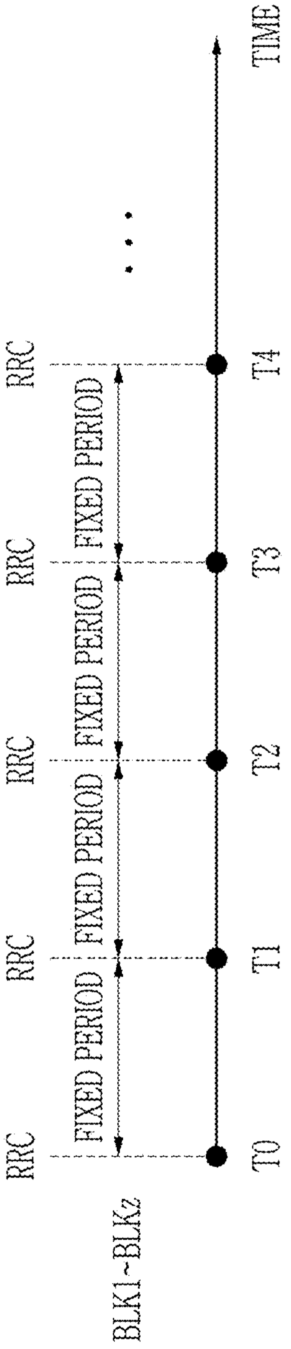
FIG. 3 is a drawing for explaining a storage device according to an exemplary embodiment which performs a read reclaim operation with a fixed period.

FIG. 3 is a drawing for explaining a storage device according to an exemplary embodiment which performs a read reclaim operation with a fixed period.

Referring to FIG. 3, at a time point TO, the read reclaim controller 1211 may control the non-volatile memory device 1100 to perform a read reclaim operation RRC on the plurality of memory blocks BLK1 to BLKz.

In the exemplary embodiment, the read reclaim controller 1211 may control the non-volatile memory device 1100 to perform a read reclaim operation RRC on the plurality of memory blocks BLK1 to BLKz at a time point T1 when a fixed period (FIXED PERIOD) has elapsed from the time point TO.

In the exemplary embodiment, the read reclaim controller 1211 may control the non-volatile memory device 1100 to perform a read reclaim operation RRC on the plurality of memory blocks BLK1 to BLKz at each of a time point T2, a time point T3, and a time point T4 having intervals of the fixed period (FIXED PERIOD).

In the exemplary embodiment, the read reclaim controller 1211 may control the non-volatile memory device 1100 to perform the read reclaim operation on the plurality of memory blocks BLK1 to BLKz with the fixed period (FIXED PERIOD).

In the exemplary embodiment, in the data stored in one memory block of the plurality of memory blocks BLK1 to BLKz, the number of uncorrectable error bits may be reached before the fixed period (FIXED PERIOD) elapses. In the exemplary embodiment, in the data stored in another memory block of the plurality of memory blocks BLK1 to BLKz, the number of uncorrectable error bits may not be reached even after the fixed period elapses two or more times. In the exemplary embodiment, the respective numbers of error bits which occur in the data stored in the plurality of memory blocks BLK1 to BLKz over time may differ.

In the exemplary embodiment, while performing the read reclaim operation with the fixed period (FIXED PERIOD), the storage device 1000 may determine respective error bit counts for each of the plurality of memory blocks BLK1 to BLKz, and determine different respective reclaim periods according to which to perform read reclaim operations on each of the plurality of memory blocks BLK1 to BLKz based on their respective error bit counts.

Figure 4:
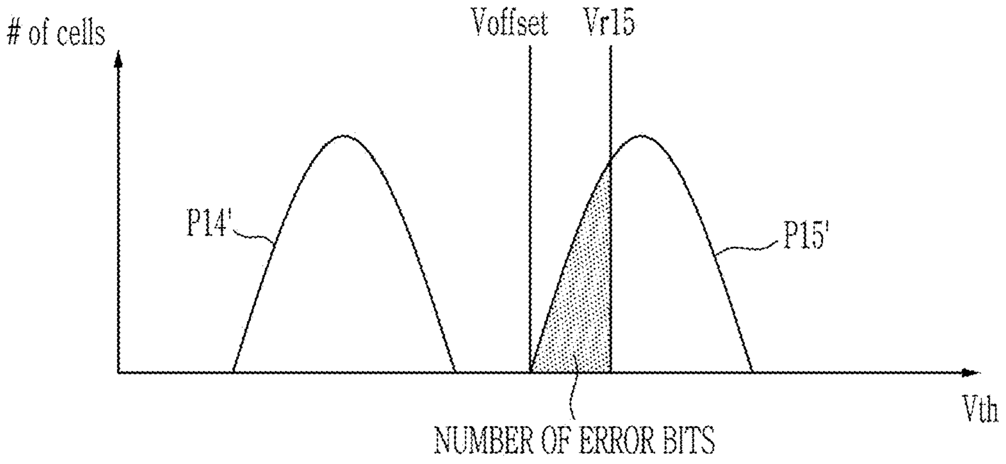
FIG. 4 is a drawing for explaining the storage device according to the exemplary embodiment which detects the numbers of error bits of memory cells based on a reference program state.

FIG. 4 is a drawing for explaining the storage device according to the exemplary embodiment which detects the numbers of error bits of memory cells based on a reference program state.

In FIG. 4, the horizontal axis of the graph represents the threshold voltage Vth of the memory cells and the vertical axis of the graph represents the number of memory cells (# of cells).

Referring to FIG. 4, the read reclaim controller 1211 may control the non-volatile memory device 1100 to perform a read reclaim operation on the plurality of memory blocks BLK1 to BLKz with the fixed period. While performing the read reclaim operation with the fixed period, the read reclaim controller 1211 may read the data stored in the plurality of memory blocks BLK1 to BLKz, and determine respective error bit counts for each of the plurality of memory blocks BLK1 to BLKz.

In the exemplary embodiment, the read reclaim controller 1211 may determine the respective error bit counts for each of the plurality of memory blocks BLK1 to BLKz based on respective numbers of memory cells in the plurality of memory blocks BLK1 to BLKz that have threshold voltages lower than a read voltage associated with a reference program state and higher than an offset voltage $V_{offset}$.

In the exemplary embodiment, the reference program state may be a program state having a greatest associated rate of threshold voltage degradation. In the exemplary embodiment, the plurality of memory blocks BLK1 to BLKz may comprise QLCs, and the reference program state may be the fifteenth program state P15. With reference to FIG. 4, the case where the reference program state is the fifteenth program state P15 will be described as an example.

In the exemplary embodiment, the read reclaim controller 1211 may determine the respective error bit counts of each the plurality of memory blocks BLK1 to BLKz using the fifteenth read voltage Vr15 associated with the fifteenth program state P15 and the offset voltage $V_{offset}$. The offset voltage $V_{offset}$ may be a voltage having a preset difference from the fifteenth read voltage Vr15.

Specifically, to determine the error bit count for a given memory block, the read reclaim controller 1211 may control the non-volatile memory device 1100 to apply the fifteenth read voltage Vr15 to determine a number of memory cells of the memory block that have threshold voltages exceeding the fifteenth read voltage, and apply the offset voltage $V_{offset}$ to determine a number of memory cells of the memory block that have threshold voltages exceeding the offset voltage $V_{offset}$.

The read reclaim controller 1211 may determine the error bit count for the memory block as a difference between the number of memory cells having threshold voltages exceeding the fifteenth read voltage Vr15 and the number of memory cells having threshold voltages exceeding the offset voltage $V_{offset}$.

Figure 5:
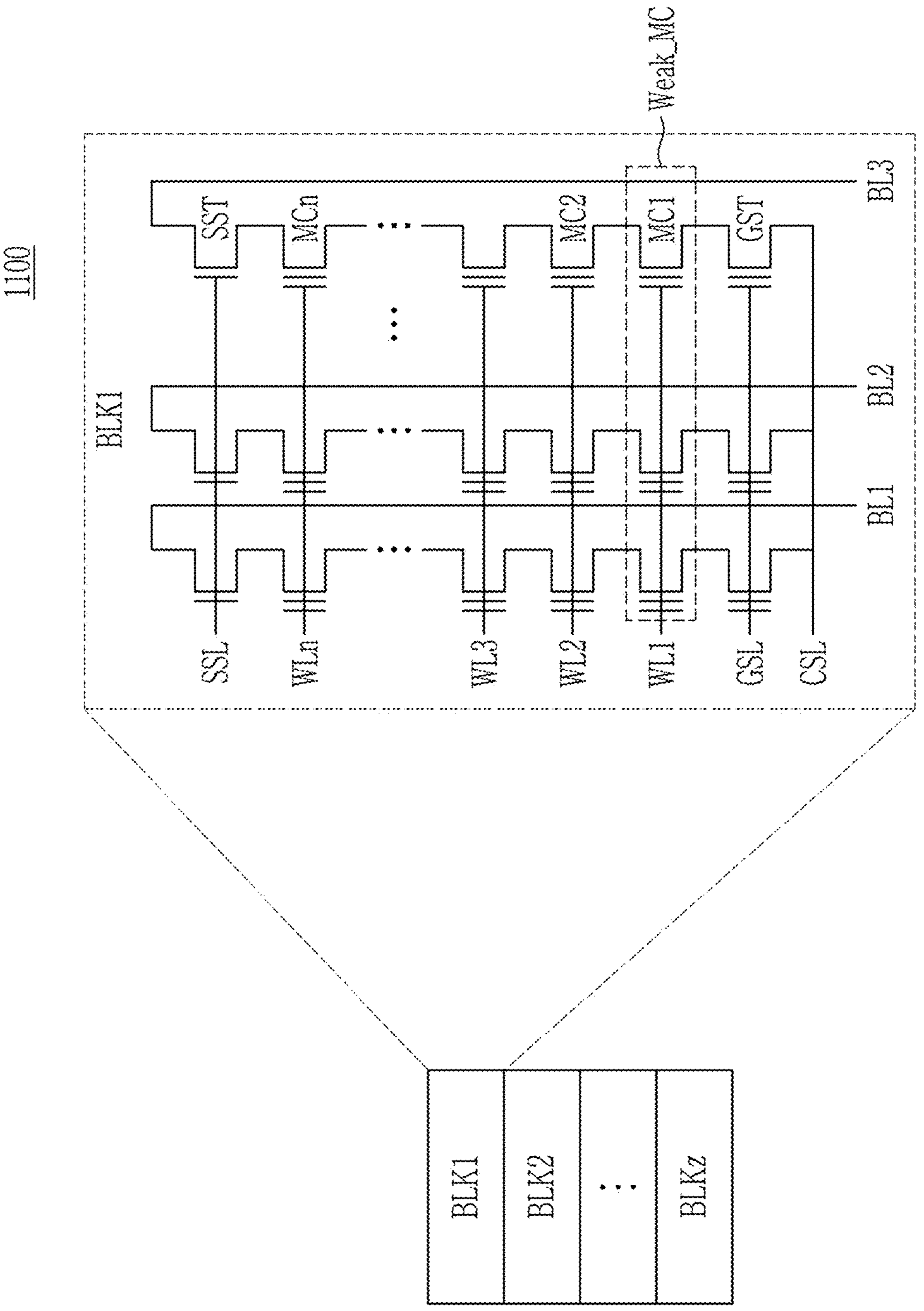
FIG. 5 is a drawing for explaining the storage device according to exemplary embodiment which detects the numbers of error bits of memory cells connected to weak word lines.

FIG. 5 is a drawing for explaining the storage device according to exemplary embodiment which detects the numbers of error bits of memory cells connected to weak word lines.

Referring to FIG. 5, the first memory block BLK1 which is one memory block of the plurality of memory blocks BLK1 to BLKz may include a plurality of word lines WL1 to WLn connected between a string selection line SSL and a ground selection line GSL. To each of the plurality of word lines WL1 to WLn, a plurality of memory cells MC1 to MCn may be connected.

In the exemplary embodiment, while performing the read reclaim operation with the fixed period, the read reclaim controller 1211 may read the data stored in the plurality of memory blocks BLK1 to BLKz, and determine respective error bit counts for each of the plurality of memory blocks BLK1 to BLKz.

In the exemplary embodiment, the read reclaim controller 1211 may determine the respective error bit counts for each of the plurality of memory blocks BLK1 to BLKz based on numbers of error bits of weak memory cells Weak_MC connected to weak word lines of those memory blocks.

In the exemplary embodiment, the weak word line of any given memory block may be a word line to which memory cells having greatest associated rates of voltage degradation (weak memory cells or Weak_MC) are connected. The weak memory cells Weak_MC and weak word lines of the various memory blocks may be determined through testing performed during the production stage. In the example depicted in FIG. 5, the weak word line of the first memory block BLK1 is the first word line WL1, to which weak memory cells Weak_MC that include the first memory cells MC1 are connected.

In the exemplary embodiment, the read reclaim controller 1211 may detect the numbers of error bits of the weak memory cells Weak_MC connected to the weak word line using the plurality of read voltages and offset voltages corresponding to the plurality of read voltages. In the exemplary embodiment, the read reclaim controller 1211 may determine the respective error bit counts of each of the plurality of memory blocks BLK1 to BLKz as the numbers of error bits in the weak memory cells Weak_MC connected to the respective weak word lines of each of the plurality of memory blocks BLK1 to BLKz.

Figure 6:
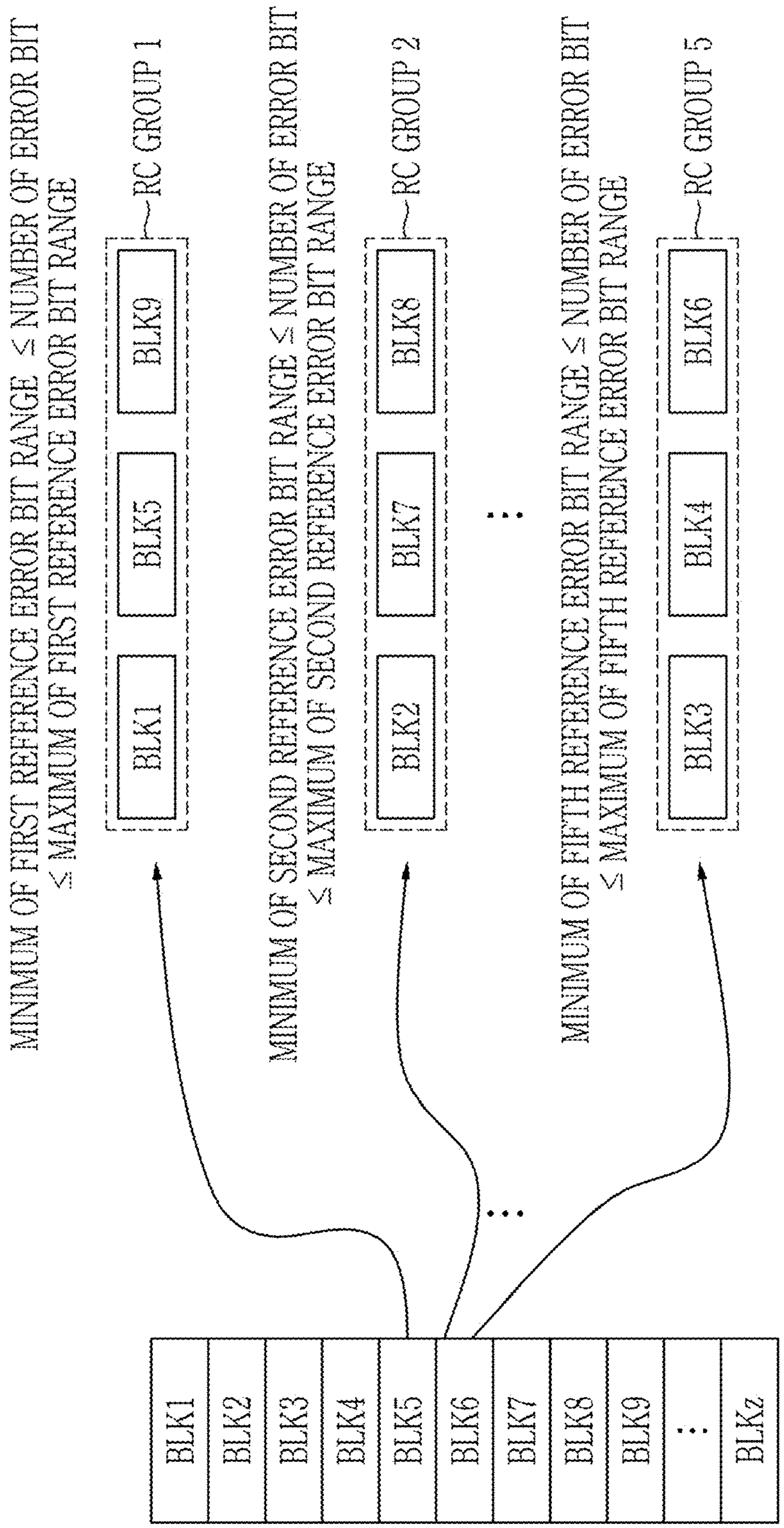
FIG. 6 is a drawing for explaining the storage device according to the exemplary embodiment which assigns memory blocks to reclaim groups based on error bit counts of the memory blocks.

FIG. 6 is a drawing for explaining the storage device according to the exemplary embodiment which assigns memory blocks to reclaim groups based on error bit counts of the memory blocks.

Referring to FIG. 6, the read reclaim controller 1211 may control the non-volatile memory device 1100 to perform the read reclaim operation on each of the plurality of memory blocks BLK1 to BLKz with the fixed period. While performing the read reclaim operation on each of the plurality of memory blocks BLK1 to BLKz, the read reclaim controller 1211 may read the data stored in each of the plurality of memory blocks BLK1 to BLKz, and determine the respective error bit counts of each of the plurality of memory blocks BLK1 to BLKz.

In the exemplary embodiment, the read reclaim controller 1211 may assign each of the plurality of memory blocks BLK1 to BLKz to one of the plurality of reclaim groups based on the error bit count of that memory block. The read reclaim controller 1211 may assign memory blocks to reclaim groups based on comparisons of error bit counts of the memory blocks with reference error bit count ranges. The read reclaim controller 1211 may assign each memory block to a reclaim group having an associated reference error bit count range that contains the error bit count for that memory block.

In the exemplary embodiment, the read reclaim controller 1211 may assign memory blocks having error bit counts falling within a first reference error bit count range to a first reclaim group RC GROUP 1.

In the exemplary embodiment, the first memory block BLK1, the fifth memory block BLK5, and the ninth memory block BLK9 may have error bit counts equal to or greater than the minimum value of the first reference error bit count range and equal to or smaller than the maximum value of the first reference error bit count range, and may therefore be assigned to the first reclaim group RC GROUP 1.

In the exemplary embodiment, the read reclaim controller 1211 may assign memory blocks having error bit counts falling within a second reference error bit count range to a second reclaim group RC GROUP 2.

In the exemplary embodiment, the second memory block BLK2, the seventh memory block BLK7, and the eighth memory block BLK8 may have error bit counts equal to or greater than the minimum value of the second reference error bit count range and equal to or smaller than the maximum value of the second reference error bit count range, and may therefore be assigned to the second reclaim group RC GROUP 2.

In the exemplary embodiment, the maximum value of the second reference error bit count range may be lower than the minimum value of the first reference error bit count range. In the exemplary embodiment, the numbers of error bits of each of the first memory block BLK1, the fifth memory block BLK5, and the ninth memory block BLK9 may be greater than the numbers of error bits of each of the second memory block BLK2, the seventh memory block BLK7, and the eighth memory block BLK8.

In the exemplary embodiment, the read reclaim controller 1211 may assign memory blocks having error bit counts falling within a fifth reference error bit count range to a fifth reclaim group RC GROUP 5.

In the exemplary embodiment, the third memory block BLK3, the fourth memory block BLK4, and the sixth memory block BLK6 may have error bit counts equal to or greater than the minimum value of the fifth reference error bit count range and equal to or smaller than the maximum value of the fifth reference error bit count range, and may therefore be assigned to the fifth reclaim group RC GROUP 5.

In the exemplary embodiment, the maximum value of the fifth reference error bit count range may be lower than the minimum value of the second reference error bit count range. In the exemplary embodiment, the numbers of error bits of each of the second memory block BLK2, the seventh memory block BLK7, and the eighth memory block BLK8 may be greater than the numbers of error bits of each of the third memory block BLK3, the fourth memory block BLK4, and the sixth memory block BLK6.

Although FIG. 6 illustrates an example in which each of the plurality of memory blocks BLK1 to BLKz is assigned to one of five reclaim groups RC GROUP 1 to RC GROUP 5, four or less reclaim groups or six or more reclaim groups may be implemented.

FIG. 7 is a drawing for explaining the storage device according to the exemplary embodiment which generates the reclaim group information based on error bit counts of memory blocks.

Referring to FIG. 7, the read reclaim controller 1211 may assign the plurality of memory blocks BLK1 to BLKz to reclaim groups based on the respective error bit counts of the plurality of memory blocks BLK1 to BLKz, and generate reclaim group information 1221 relating to the plurality of reclaim groups.

In the exemplary embodiment, the read reclaim controller 1211 may generate ID information BLK ID indicating the IDs of the memory blocks included in each of the plurality of reclaim groups. The read reclaim controller 1211 may generate reclaim period information RC PERIOD indicating the reclaim periods according to which to perform read reclaim operations on each of the plurality of reclaim groups. The read reclaim controller 1211 may generate reference error bit count range information (REFERENCE ERROR BIT RANGE) describing reference error bit count ranges associated with each of the plurality of reclaim groups.

In the exemplary embodiment, the read reclaim controller 1211 may assign the plurality of memory blocks BLK1 to BLKz to reclaim groups, generate the reclaim group information 1221 including the ID information BLK ID identifying respective memory blocks assigned to each of the plurality of reclaim groups, reference error bit range information (REFERENCE ERROR BIT RANGE), and the reclaim period information RC PERIOD, and may store the reclaim group information 1221 in the volatile memory 1220.

In the exemplary embodiment, the reclaim group information 1221 may include information associated with the first to fifth reclaim groups RC GROUP 1 to RC GROUP 5. In the exemplary embodiment, the information associated with the first to fifth reclaim groups RC GROUP 1 to RC GROUP 5 may include the ID information BLK ID indicating the IDs of the memory blocks included in the first to fifth reclaim groups RC GROUP 1 to RC GROUP 5.

In the exemplary embodiment, the information associated with the first reclaim group RC GROUP 1 may include the ID information of the first memory block BLK1, the fifth memory block BLK5, and the ninth memory block BLK9, each of which may have an error bit count falling within the first reference error bit count range (FIRST REFERENCE ERROR BIT RANGE). In the exemplary embodiment, the information associated with the second reclaim group RC GROUP 2 may include the ID information of the second memory block BLK2, the seventh memory block BLK7, and the eighth memory block BLK8, each of which may have an error bit count falling within the second reference error bit count range (SECOND REFERENCE ERROR BIT RANGE).

In the exemplary embodiment, the reclaim group information 1221 may include the reference error bit count range information (REFERENCE ERROR BIT RANGE) corresponding to each of the first to fifth reclaim groups RC GROUP 1 to RC GROUP 5. In the exemplary embodiment, the reclaim group information 1221 may include reference error bit count range information indicating that the reference error bit count range corresponding to the first reclaim group RC GROUP 1 is the first reference error bit count range (FIRST REFERENCE ERROR BIT RANGE). In the exemplary embodiment, the first memory block BLK1, the fifth memory block BLK5, and the ninth memory block BLK9 included in the first reclaim group RC GROUP 1 may have error bit counts falling within the first reference error bit count range (FIRST REFERENCE ERROR BIT RANGE).

In the exemplary embodiment, the first reference error bit count range (FIRST REFERENCE ERROR BIT RANGE) may be a range higher than the second reference error bit count range (SECOND REFERENCE ERROR BIT RANGE). The second reference error bit count range (SECOND REFERENCE ERROR BIT RANGE) may be a range higher than the fifth reference error bit count range (FIFTH REFERENCE ERROR BIT RANGE). In the exemplary embodiment, the numbers of error bits of each of the first memory block BLK1, the fifth memory block BLK5, the ninth memory block BLK9 included in the first reclaim group RC GROUP 1 may be greater than the numbers of error bits of each of the memory blocks included in the other reclaim groups. In the exemplary embodiment, the numbers of error bits of each of the third memory block BLK3, the fourth memory block BLK4, and the sixth memory block BLK6 included in the fifth reclaim group RC GROUP 5 may be smaller than the numbers of error bits of each of the memory blocks included in the other reclaim groups.

In the exemplary embodiment, the reclaim group information 1221 may include the reclaim period information RC PERIOD indicating the respective reclaim periods according to which to perform read reclaim operations on the first to fifth reclaim groups RC GROUP 1 to RC GROUP 5. In the exemplary embodiment, the reclaim group information 1221 may include first reclaim period information (PERIOD 1) indicating that the reclaim period applicable to the first reclaim group RC GROUP 1 is a first reclaim period. The reclaim group information 1221 may include second reclaim period information (PERIOD 2) indicating that the reclaim period applicable to the second reclaim group RC GROUP 2 is a second reclaim period. The reclaim group information 1221 may include fifth reclaim period information (PERIOD 5) indicating that the reclaim period applicable to the fifth reclaim group RC GROUP 5 is a fifth period.

In the exemplary embodiment, the first reclaim period may be shorter than the second reclaim period. In the exemplary embodiment, the second reclaim period may be shorter than the fifth reclaim period. In the exemplary embodiment, the first reclaim period may be shorter than the reclaim periods applicable to read reclaim operations performed on reclaim groups other than the first reclaim group. In the exemplary embodiment, the fifth reclaim period may be longer than the reclaim periods applicable to read reclaim operations performed on reclaim groups other than the fifth reclaim group.

Figure 8:
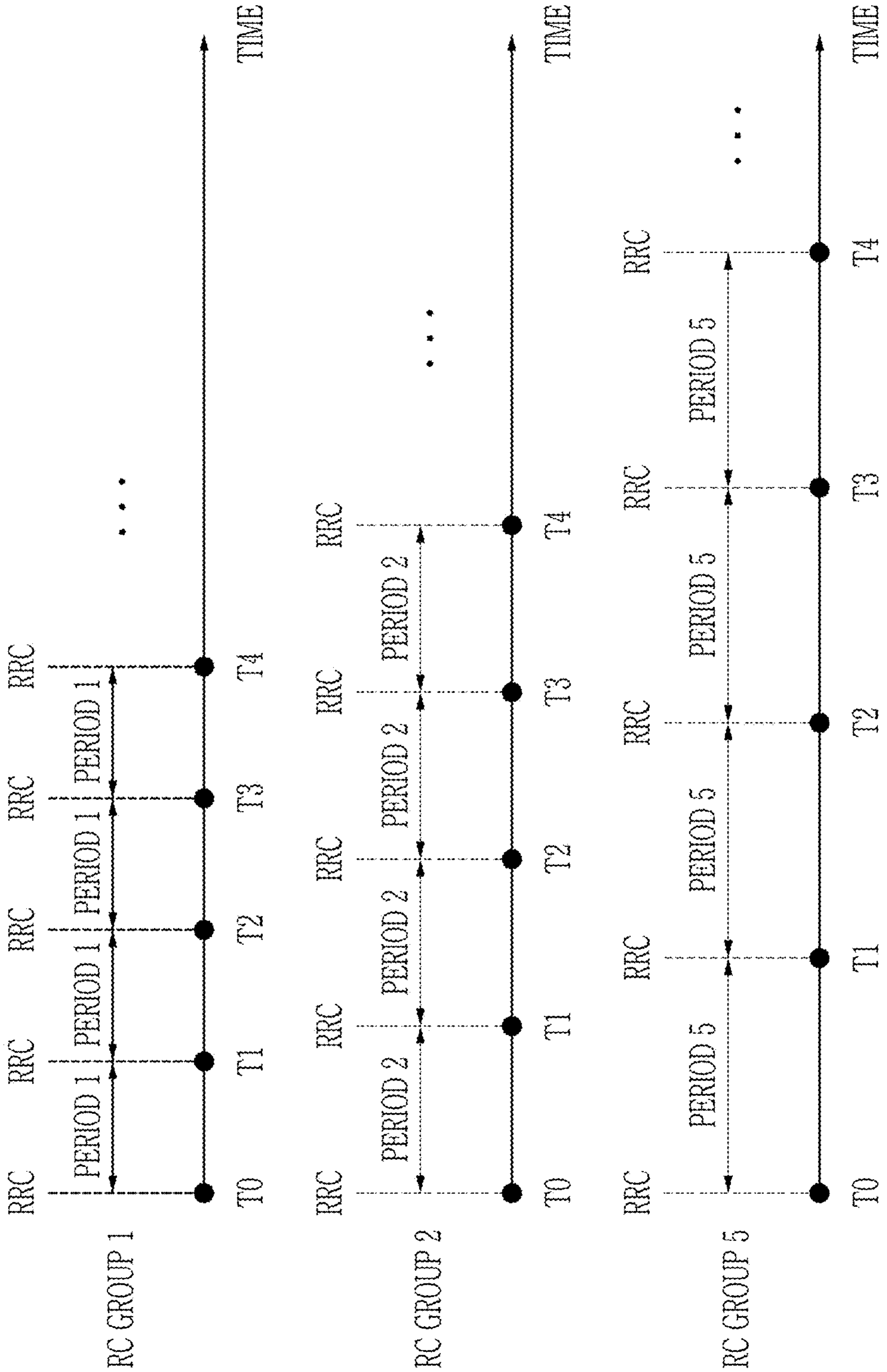
FIG. 8 is a drawing for explaining the storage device according to the exemplary embodiment which performs read reclaim operations for different reclaim groups according to different reclaim periods.

FIG. 8 is a drawing for explaining the storage device according to the exemplary embodiment which performs read reclaim operations for different reclaim groups according to different reclaim periods.

Referring to FIG. 8, the read reclaim controller 1211 may control the non-volatile memory device 1100 to perform read reclaim operations RRC on the plurality of reclaim groups on the basis of the reclaim group information 1221 stored in the volatile memory 1220.

In the exemplary embodiment, the read reclaim controller 1211 may identify the memory blocks included in a reclaim group on the basis of the ID information of the memory blocks included in the reclaim group information 1221. The read reclaim controller 1211 may identify the reclaim period according to which to perform read reclaim operation RRC on a reclaim group on the basis of the reclaim period information included in the reclaim group information 1221.

In the exemplary embodiment, on the basis of the reclaim group information 1221, the read reclaim controller 1211 may identify the first memory block BLK1, the fifth memory block BLK5, the ninth memory block BLK9 as being included in the first reclaim group, and identify the reclaim period according to which to perform a read reclaim operation RRC on the first reclaim group RC GROUP 1 as the first reclaim period PERIOD 1. The read reclaim controller 1211 may control the non-volatile memory device 1100 to perform the read reclaim operation RRC on the first reclaim group RC GROUP 1 according to the first reclaim period PERIOD 1.

In the exemplary embodiment, at a time point TO, the read reclaim controller 1211 may control the non-volatile memory device 1100 to perform a read reclaim operation RRC on the first reclaim group RC GROUP 1. The read reclaim controller 1211 may control the non-volatile memory device 1100 to perform a read reclaim operation RRC on the first reclaim group RC GROUP 1 at each of a time point T1, a time point T2, a time point T3, and a time point T4 having intervals of the first reclaim period PERIOD 1.

In the exemplary embodiment, on the basis of the reclaim group information 1221, the read reclaim controller 1211 may identify the second memory block BLK2, the seventh memory block BLK7, and the eighth memory block BLK8 as being included in the second reclaim group RC GROUP 2, and identify the reclaim period according to which to perform a read reclaim operation RRC on the second reclaim group RC GROUP 2 as the second period PERIOD 2. The read reclaim controller 1211 may control the non-volatile memory device 1100 to perform the read reclaim operation RRC on the second reclaim group RC GROUP 2 according to the second reclaim period PERIOD 2.

In the exemplary embodiment, at a time point TO, the read reclaim controller 1211 may control the non-volatile memory device to perform a read reclaim operation RRC on the second reclaim group RC GROUP 2. The read reclaim controller 1211 may control the non-volatile memory device 1100 to perform a read reclaim operation RRC on the second reclaim group RC GROUP 2 at each of a time point T1, a time point T2, a time point T3, and a time point T4 having intervals of the second reclaim period PERIOD 2.

In the exemplary embodiment, the first reclaim period PERIOD 1 may be shorter than the second reclaim period PERIOD 2. In the exemplary embodiment, the numbers of error bits of each of the first memory block BLK1, the fifth memory block BLK5, the ninth memory block BLK9 included in the first reclaim group RC GROUP 1 may be greater than the numbers of error bits of each of the second memory block BLK2, the seventh memory block BLK7, and the eighth memory block BLK8 included in the second reclaim group RC GROUP 2.

In the exemplary embodiment, the storage device 1000 may perform read reclaim operations on a reclaim group including memory blocks having larger numbers of error bits at a higher frequency relative to that at which it performs read reclaim operations on a reclaim group including memory blocks having smaller numbers of error bits, in order to prevent the memory blocks having larger numbers of error bits from accumulating more than the number of uncorrectable error bits. In the exemplary embodiment, on the basis of the reclaim group information 1221, the read reclaim controller 1211 may identify the third memory block BLK3, the fourth memory block BLK4, and the sixth memory block BLK6 as being included in the fifth reclaim group RC GROUP 5, and identify the reclaim period according to which to perform a read reclaim operation RRC on the fifth reclaim group RC GROUP 5 as the fifth reclaim period PERIOD 5. The read reclaim controller 1211 may control the non-volatile memory device 1100 to perform the read reclaim operation RRC on the fifth reclaim group RC GROUP 5 according to the fifth reclaim period PERIOD 5.

In the exemplary embodiment, at a time point TO, the read reclaim controller 1211 may control the non-volatile memory device 1100 to perform a read reclaim operation RRC on the fifth reclaim group RC GROUP 5. The read reclaim controller 1211 may control the non-volatile memory device 1100 to perform a read reclaim operation RRC on the fifth reclaim group RC GROUP 5 at each of a time point T1, a time point T2, a time point T3, and a time point T4 having intervals of the fifth reclaim period PERIOD 5.

In the exemplary embodiment, the fifth reclaim period PERIOD 5 may be longer than the second reclaim period PERIOD 2. In the exemplary embodiment, the numbers of error bits of each of the third memory block BLK3, the fourth memory block BLK4, and the sixth memory block BLK6 included in the fifth reclaim group RC GROUP 5 may be smaller than the numbers of error bits of each of the second memory block BLK2, the seventh memory block BLK7, and the eighth memory block BLK8 included in the second reclaim group RC GROUP 2.

In the exemplary embodiment, the storage device 1000 may perform read reclaim operations on a reclaim group including memory blocks having smaller numbers of error bits at a lower frequency relative to that at which it performs read reclaim operations on a reclaim group including memory blocks having larger numbers of error bits, in order to prevent read reclaim operations from being unnecessarily performed on memory blocks having small numbers of error bits.

Figure 9:
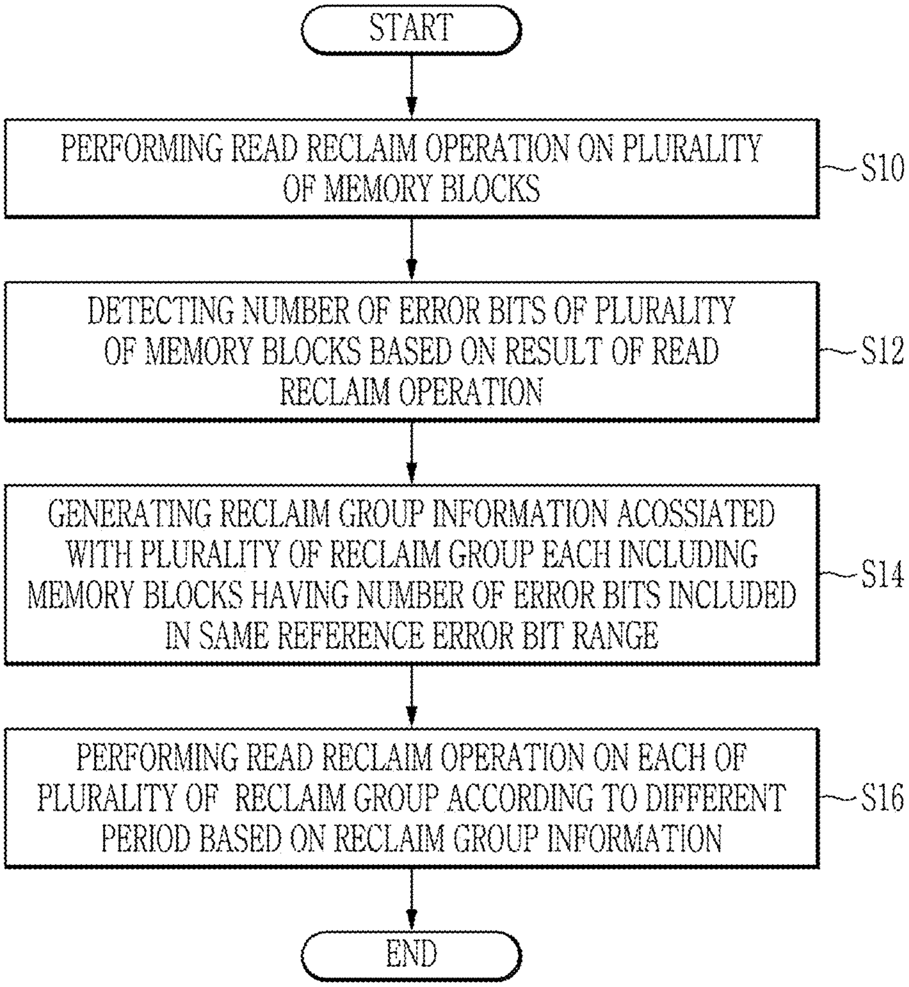
FIG. 9 is a drawing for explaining the storage device according to the exemplary embodiment which performs read reclaim operations based on reclaim group information.

FIG. 9 is a drawing for explaining the storage device according to the exemplary embodiment which performs read reclaim operations based on reclaim group information.

Referring to FIG. 9, in STEP S10, the storage device 1000 may perform a read reclaim operation on the plurality of memory blocks.

In STEP S12, the storage device 1000 may detect the numbers of error bits of the plurality of memory blocks on the basis of the result of the read reclaim operation. In the exemplary embodiment, the storage device 1000 may determine the numbers of error bits of the plurality of memory blocks based on a difference between numbers of memory cells in the memory blocks having threshold voltages exceeding a read voltage associated with a reference program state and numbers of memory cells in the memory blocks having threshold voltages exceed an offset voltage. The reference program state may be a program state having a greatest associated rate of threshold voltage degradation. In some examples, the storage device 1000 may determine the number of error bits of a memory block as a number of error bits in weak memory cells connected to a weak word line of that memory block.

In STEP S14, based on the numbers of error bits detected in STEP S12, the storage device 1000 may generate reclaim group information associated with a plurality of reclaim groups each of which includes memory blocks having numbers of error bits falling within the same reference error bit count range. In the exemplary embodiment, the reclaim group information may include ID information indicating IDs of the memory blocks included in each of the plurality of reclaim groups, reference error bit count range information corresponding to each of the plurality of reclaim groups, and reclaim period information indicating the respective reclaim periods according to which to perform read reclaim operations on each of the plurality of reclaim groups.

In STEP S16, the storage device 1000 may perform read reclaim operations on each of the plurality of reclaim groups with different respective reclaim periods, based on the reclaim group information.

Figure 10:
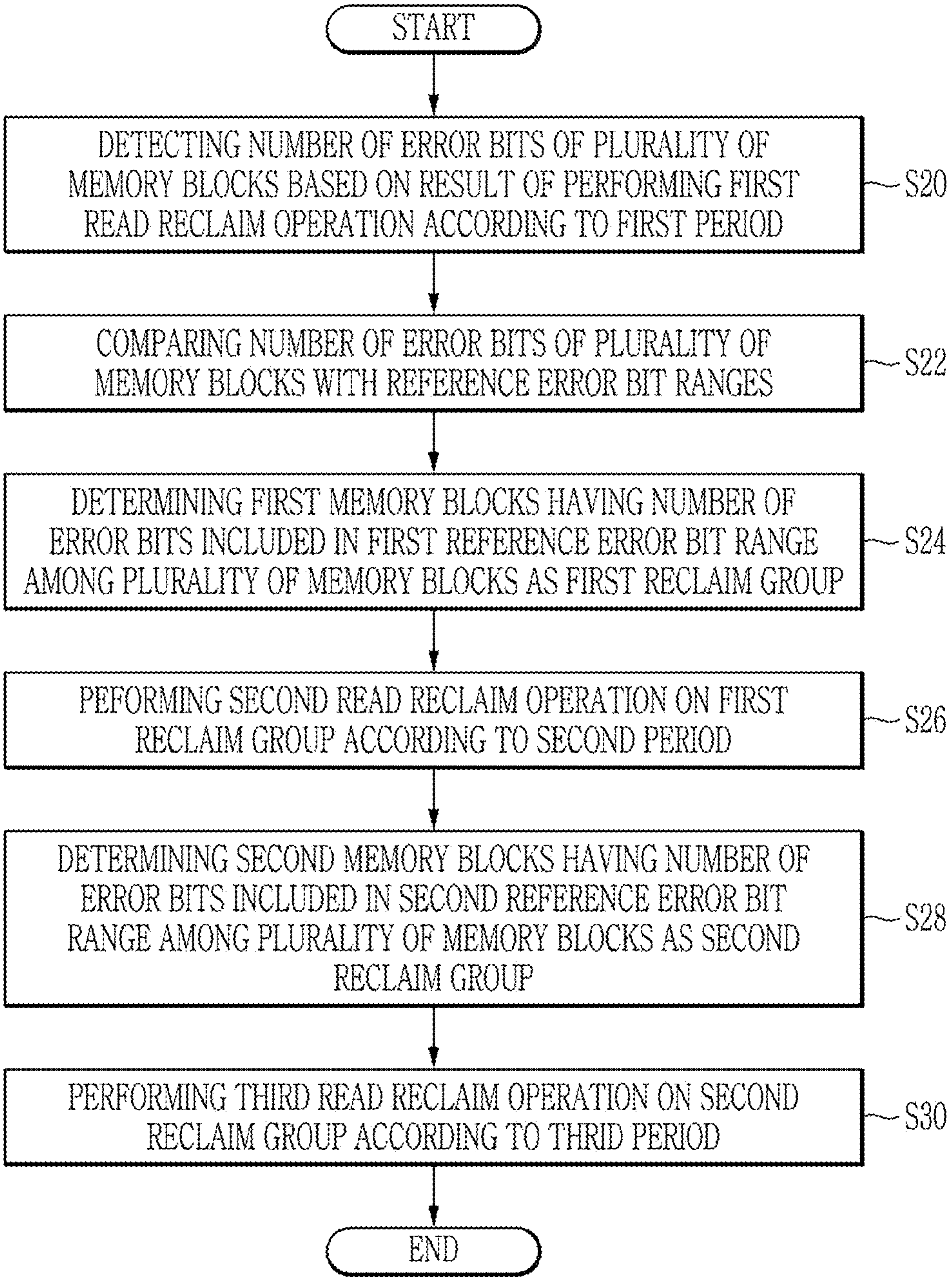
FIG. 10 is a flow chart for explaining the storage device according to the exemplary embodiment which performs respective read reclaim operations for two different reclaim groups according to two different reclaim periods.

FIG. 10 is a flow chart for explaining the storage device according to the exemplary embodiment which performs respective read reclaim operations for two different reclaim groups according to two different reclaim periods.

Referring to FIG. 10, in STEP S20, the storage device 1000 may detect the numbers of error bits of the plurality of memory blocks based on a first read reclaim operation performed on the plurality of memory blocks according to a first reclaim period. The first reclaim period may correspond to the fixed period described above with reference to FIG. 3. In the exemplary embodiment, while performing the first read reclaim operation, the storage device 1000 may read the data stored in the plurality of memory blocks, and detect the numbers of error bits included in the data.

In STEP S22, the storage device 1000 may compare the numbers of error bits of the plurality of memory blocks with the reference error bit ranges.

In STEP S24, the storage device 1000 may determine first memory blocks having numbers of error bits falling within a first reference error bit count range as the first reclaim group.

In STEP S26, the storage device 1000 may perform a second read reclaim operation on the first reclaim group according to a second reclaim period. In the exemplary embodiment, the second reclaim period may be shorter than the first reclaim period.

In STEP S28, the storage device 1000 may determine second memory blocks having numbers of error bits falling within a second reference error bit count range as the second reclaim group. In the exemplary embodiment, the second reference error bit count range may be a range lower than the first reference error bit count range. In the exemplary embodiment, the number of error bits of each of the second memory blocks may be smaller than the number of error bits of each of the first memory blocks.

In STEP S30, the storage device 1000 may perform a third read reclaim operation on the second reclaim group according to a third reclaim period. In the exemplary embodiment, the third reclaim period may be longer than the first reclaim period.

Figure 11:
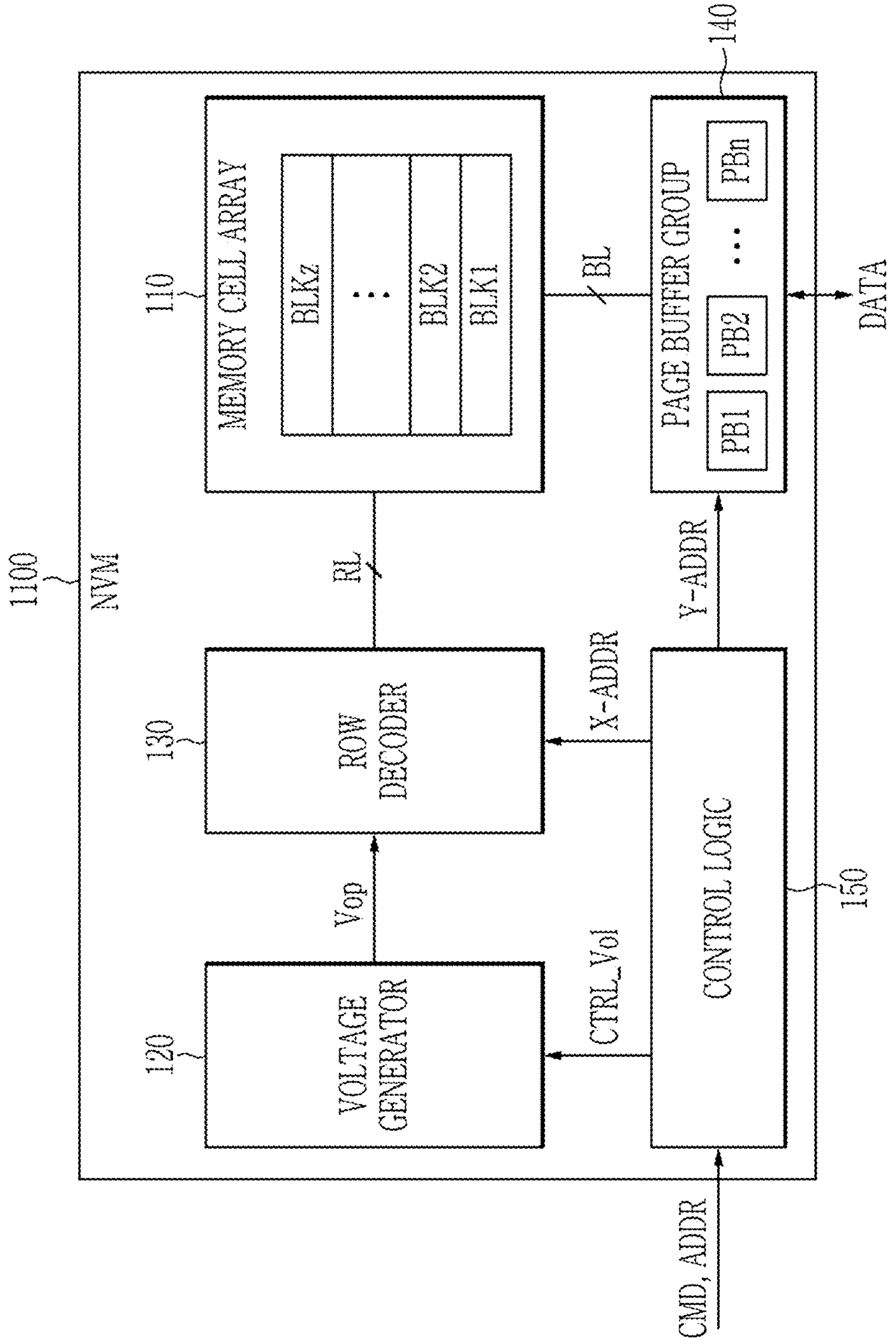
FIG. 11 is a drawing for explaining a non-volatile memory device according to the exemplary embodiment.

FIG. 11 is a drawing for explaining the non-volatile memory device according to the exemplary embodiment.

Referring to FIG. 11, the non-volatile memory device 1100 may include a memory cell array 110, a voltage generator 120, a row decoder 130, a page buffer group 140, and a control logic 150.

The memory cell array 110 may include the plurality of memory blocks BLK1 to BLKz. The plurality of memory blocks BLK1 to BLKz may be connected to the row decoder 130 through row lines RL. The plurality of memory blocks BLK1 to BLKz may be connected to the page buffer group 140 through bit lines BL.

Each of the memory blocks BLK1 to BLKz may include a plurality of memory cells. In the exemplary embodiment, the plurality of memory cells may be non-volatile memory cells.

The voltage generator 120 may generate operating voltages Vop using an external power voltage supplied to the non-volatile memory device 1100. The voltage generator 120 may operate in response to the control of the control logic 150.

In the exemplary embodiment, the voltage generator 120 may generate the operating voltages Vop to be used in programming operations, read operations, and erase operations. For example, the voltage generator 120 may generate an erase voltage, a programming voltage, a pass voltage, and a read voltage. The operating voltages Vop may be supplied to the memory cell array 110 by the row decoder 130.

The row decoder 130 may be connected to the memory cell array 110 through the row lines RL. The row lines RL may include drain selection lines, the word lines, and source selection lines.

The row decoder 130 may be configured to operate in response to the control of the control logic 150. The row decoder 130 may receive a row address X-ADDR from the control logic 150. In the exemplary embodiment, the row decoder 130 may select at least one word line from the plurality of word lines on the basis of the row address X-ADDR, and apply the operating voltages Vop provided from the voltage generator 120 to at least one word line.

In the exemplary embodiment, during a programming operation, the row decoder 130 may apply the programming voltage to the word lines selected from the plurality of word lines and apply the pass voltage at a level lower than the programming voltage to the nonselected word lines. During a programming verification operation, the row decoder 130 may apply a verification voltage to the selected word lines and apply a verification pass voltage at a level higher than the verification voltage to the nonselected word lines.

During a read operation, the row decoder 130 may apply the read voltage to the selected word lines and apply a read pass voltage at a level higher than the read voltage to the nonselected word lines.

The page buffer group 140 may include a plurality of page buffers PB1 to PBn. The plurality of page buffers PB1 to PBn may be connected to the memory cell array 110 through the bit lines BL, respectively. The plurality of page buffers PB1 to PBn may operate in response to the control of the control logic 150.

In the exemplary embodiment, the plurality of page buffers PB1 to PBn may receive data DATA from the outside. The plurality of page buffers PB1 to PBn may select at least one bit line from the bit lines BL on the basis of a column address Y-ADDR received from the control logic 150.

In the exemplary embodiment, during a programming operation, the plurality of page buffers PB1 to PBn may transmit the data received from the outside to the memory cells of the memory cell array 110 through the bit lines BL. The memory cells may be programmed according to the received data. During a programming verification operation, the plurality of page buffers PB1 to PBn may sense the data stored in the memory cells through the bit lines BL.

During a read operation, the plurality of page buffers PB1 to PBn may sense the data stored in the memory cells through the bit lines BL, and store the sensed data in the plurality of page buffers PB1 to PBn.

The control logic 150 may be connected to the voltage generator 120, the row decoder 130, and the page buffer group 140. The control logic 150 may be configured to control the overall operation of the non-volatile memory device 1100. The control logic 150 may operate in response to commands CMD received from the outside. The control logic 150 may generate various signals in response to commands CMD and addresses ADDR to control the voltage generator 120, the row decoder 130, and the page buffer group 140.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A storage device comprising:

a non-volatile memory device including a plurality of memory blocks; and a storage controller configured to:

determine a plurality of error bit counts, each of the plurality of error bit counts indicating a number of error bits of a respective one of the plurality of memory blocks;

generate, based on the plurality of error bit counts, reclaim group information associated with a plurality of reclaim groups, the reclaim group information indicating, for each of the plurality of memory blocks, a respective assigned reclaim group from among the plurality of reclaim groups and including a plurality of reclaim periods, wherein each of the plurality of reclaim groups is associated with a respective error bit count range; and control the non-volatile memory device to perform a respective read reclaim operation for each of the plurality of reclaim groups based on the reclaim group information, wherein the plurality of reclaim periods correspond to the plurality of reclaim groups respectively, and a plurality of time intervals corresponding to the plurality of reclaim periods are different from each other, wherein for each of the plurality of reclaim groups, the respective read reclaim operation is repeatedly performed upon expiration of a time interval corresponding to the respective assigned reclaim group among the plurality of time intervals.

2. The storage device of claim 1, wherein:

the reclaim group information includes reclaim period information indicating a respective reclaim period for each of the plurality of reclaim groups.

3. The storage device of claim 1, wherein:

the storage controller is configured to generate the reclaim group information based on comparing the plurality of error bit counts with reference error bit count ranges.

4. The storage device of claim 3, wherein:

the plurality of reclaim groups includes:

a first reclaim group including a first set of memory blocks among the plurality of memory blocks, the first set of memory blocks having associated error bit counts falling within a first reference error bit count range; and a second reclaim group including a second set of memory blocks among the plurality of memory blocks, the second set of memory blocks having associated error bit counts falling within a second reference error bit count range.

5. The storage device of claim 4, wherein:

the respective read reclaim operation for the first reclaim group is performed according to a first reclaim period and the respective read reclaim operation for the second reclaim group is performed according to a second reclaim period different from the first reclaim period.

6. The storage device of claim 5, wherein:

the first reclaim period is shorter than the second reclaim period; and the associated error bit counts of the first set of memory blocks included in the first reclaim group are greater than the associated error bit counts of the second set of memory blocks included in the second reclaim group.

7. The storage device of claim 1, wherein the storage controller is configured to determine the plurality of error bit counts based on a reference program state, wherein the reference program state is one of a plurality of program states recognized by the storage controller.

8. The storage device of claim 7, wherein the storage controller is configured to:

for each of the plurality of memory blocks, determine a respective associated error bit count based on a number of memory cells of that memory block that have threshold voltages lower than a read voltage associated with the reference program state and higher than an offset voltage.

9. The storage device of claim 8, wherein:

the read voltage associated with the reference program state is higher than the respective read voltages associated with each other program state among the plurality of program states.

10. A storage device comprising:

a non-volatile memory device including a plurality of memory blocks; and a storage controller configured to:

assign, to a first reclaim group, a first set of memory blocks among the plurality of memory blocks, the first set of memory blocks having respective error bit counts falling within a first reference error bit count range;

assign, to a second reclaim group, a second set of memory blocks among the plurality of memory blocks, the second set of memory blocks having respective error bit counts falling within a second reference error bit count range; and control the non-volatile memory device to perform a read reclaim operation for the first reclaim group according to a first reclaim period and perform a read reclaim operation for the second reclaim group according to a second reclaim period different from the first reclaim period, wherein:

a smallest error bit count included in the first reference error bit count range exceeds a largest error bit count included in the second reference error bit count range.

11. The storage device of claim 10, wherein:

the first reclaim period is shorter than the second reclaim period.

12. The storage device of claim 10, wherein the storage controller is configured to:

determine the respective error bit counts of the first set of memory blocks and the respective error bit counts of the second set of memory blocks based on a read reclaim operation performed on the plurality of memory blocks.

13. The storage device of claim 12, wherein:

the storage controller is configured to generate reclaim group information including first reclaim period information indicating the first reclaim period and second reclaim period information indicating the second reclaim period.

14. The storage device of claim 10, wherein:

the storage controller is configured to control the non-volatile memory device to migrate data stored in the first set of memory blocks and data stored in the second set of memory blocks to free blocks while performing the respective read reclaim operations for the first reclaim group and the second reclaim group.

15. The storage device of claim 10, wherein the storage controller is configured to:

determine the respective error bit counts of the first set of memory blocks based on numbers of error bits of memory cells connected to respective weak word lines of the first set of memory blocks; and determine the respective error bit counts of the second set of memory blocks based on numbers of error bits of memory cells connected to respective weak word lines of the second set of memory blocks.

16. The storage device of claim 10, wherein:

each of the plurality of memory blocks includes a plurality of memory cells; and each of the plurality of memory cells is programmable to store at least 4 bits of data.

17. A storage controller comprising:

a memory interface configured to communicate with a non-volatile memory device including a plurality of memory blocks; and a read reclaim controller configured to:

control the non-volatile memory device to perform a read reclaim operation on the plurality of memory blocks according to a set reclaim period;

based on the read reclaim operation performed on the plurality of memory blocks, determine a plurality of error bit counts including a respective error bit count for each of the plurality of memory blocks; and based on the plurality of error bit counts, identify, from among the plurality of memory blocks, a first set of memory blocks on which to perform a read reclaim operation according to a first reclaim period and a second set of memory blocks on which to perform a read reclaim operation according to a second reclaim period longer than the first reclaim period, wherein the set reclaim period is longer than the first reclaim period and shorter than the second reclaim period.

18. The storage controller of claim 17, wherein:

the respective error bit counts for the first set of memory blocks fall within a first reference error bit count range, and the respective error bit counts for the second set of memory blocks fall within a second reference error bit count range, wherein a smallest error bit count included in the first reference error bit count range exceeds a largest error bit count included in the second reference error bit count range.

19. The storage controller of claim 17, wherein:

each of the plurality of memory blocks includes a respective plurality of memory cells;

in each of the plurality of memory blocks, each of the respective plurality of memory cells is programmable into any one of a plurality of program states, the plurality of program states including an erase state and first to fifteenth program states; and the read reclaim controller is configured to, for each of the plurality of memory blocks, determine the respective error bit count based on a number of memory cells of that memory block that have threshold voltages lower than a read voltage associated with the fifteenth program state and higher than an offset voltage.

* * * * *